Dec. 4, 1962 J. BLANCHARD ET AL 3,067,372
DEVICE FOR THE AUTOMATIC STARTING OF ELECTRIC MOTORS
Filed Jan. 9, 1961 2 Sheets-Sheet 1
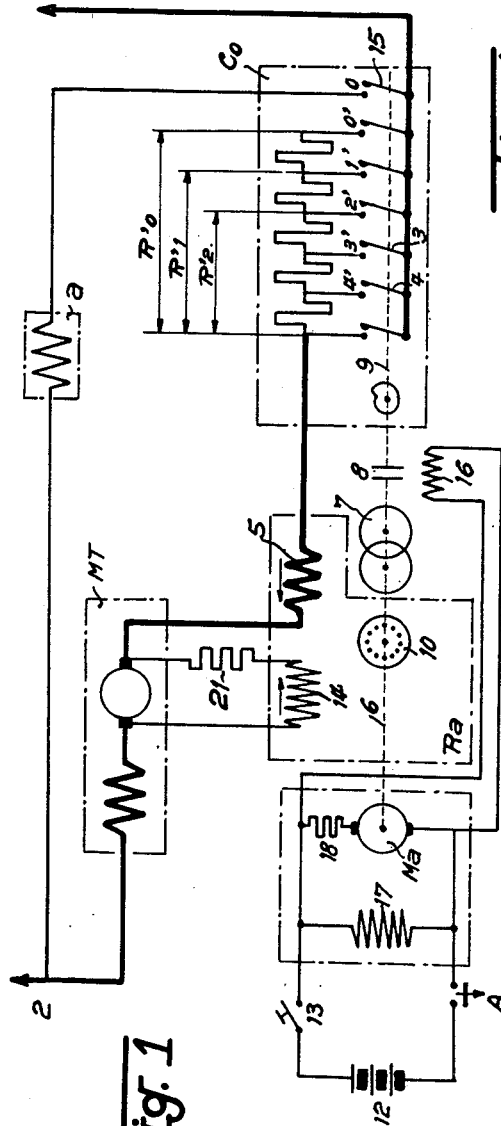
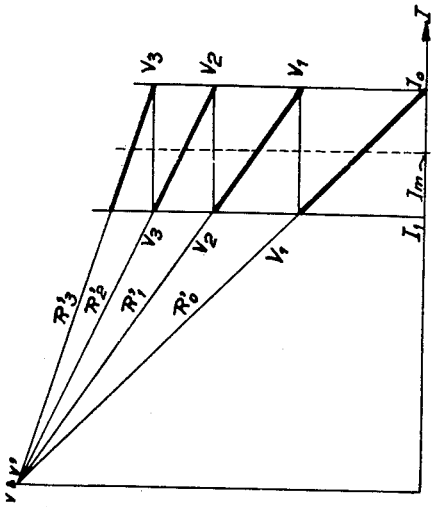
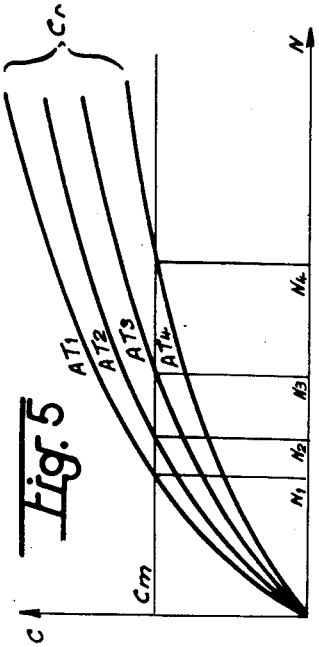
INVENTORS.
JEAN BLANCHARD
FLORIMOND DOUCHET
BY
Woodhams Blanchard and F. Lynn
ATTORNEYS Dec. 4, 1962 J. BLANCHARD ET AL 3,067,372
DEVICE FOR THE AUTOMATIC STARTING OF ELECTRIC MOTORS
Filed Jan. 9, 1961
2 Sheets-Sheet 2

INVENTORS.
JEAN BLANCHARD
FLORIMOND DOUCHET
BY
Woodhams Blanchard and Flynn
ATTORNEYS

United States Patent Office 3,067,372
Patented Dec. 4, 1962

3,067,372
DEVICE FOR THE AUTOMATIC STARTING OF ELECTRIC MOTORS
Jean Blanchard, Paris, and Florimond Douchet, Argenteuil, France; said Blanchard assignor to Vehicules et Travaux VETRA, Paris, France, a French company
Filed Jan. 9, 1961, Ser. No. 81,616
Claims priority, application France Mar. 29, 1960
2 Claims. (Cl. 318—393)

The present invention has for its object an automatic starting device for electric motors, and more especially, although not exclusively, for electric traction motors.

In motors of this type, it is sought to bring the vehicle up to its normal speed in the shortest time, without however communicating to the said vehicle any variations of acceleration which may be incompatible with the comfort of passengers. These conditions depend on the frequency with which the starting resistances are cut out of the circuit during the period of starting.

The present invention will be more particularly described with reference to the case in which the starting resistances are progressively cut out by means of a cam-type change-over switch, in which the cam-shaft is driven in rotation in such manner as to carry out the progressive elimination of the resistances.

The present invention has for its object a device which takes the place of the operator or driver for the purpose of effecting the automatic elimination of the starting resistances at an optimum rate of speed.

Consequently, the present invention has for its object a unit of the so-called "servo-motor" type controlling the speed of rotation of the cam-shaft of the change-over switch, the said unit being in turn subjected to at least two influences, one resulting from the traction current, the other resulting from the speed of the vehicle.

This servo-motor can advantageously comprise two elements: one of these elements, referred-to as the auxiliary motor, produces a substantially constant driving torque, while the other element, which is referred-to as a speed-reducer unit, produces a resistive torque in opposition to the first, the value of the said resistive torque being an increasing function of the speed of rotation of the said speed-reducer unit. The speed of rotation imparted to the cam-shaft of the change-over switch accordingly results from the positive torque of the auxiliary motor and from the negative torque of the speed-reducer unit. The regulation of this latter torque therefore pre-determines the speed of rotation which the servo-motor imparts to the cam-shaft, the auxiliary driving torque being practically fixed.

Further characteristic features of the invention will be brought out by the description which follows below, reference being made to the accompanying drawings which are given solely by way of example and not in any sense by way of implied limitation, and in which:

FIG. 1 illustrates diagrammatically a device in accordance with the invention;

FIGS. 5 and 6 are two graphs respectively relating to the pre-determination of the speeds of rotation of the servo-motor and to the conditions of starting of the traction motor.

Figure 2:
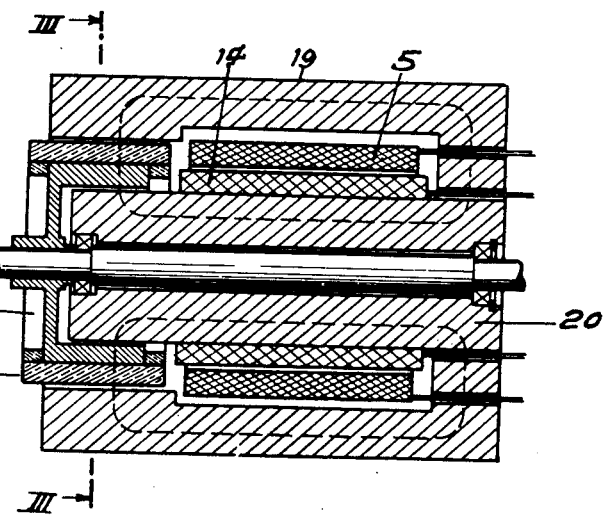
FIG. 2 is an axial cross-section of the speed-reducer device.

As shown in FIG. 1, the traction motor MT is supplied from the main current source between the input and output terminals 1 and 2, the current passing through the cam-type change-over switch Co in which, under the action of members suitably designed and displaced, contact levers such as 3—4, etc., are adapted to close successively the circuits of the starting resistances in such manner as to eliminate the said resistances successively. The current subsequently passes through a winding 5 forming part of the speed-reducer unit Ra which will be described below. Finally, there is provided an auxiliary motor Ma which drives, through the intermediary of a shaft 6, speed-reducer 7 and clutch unit 8, the cam-shaft 9 on which are mounted the cams controlling the contact levers such as those designated by the references 3, 4, etc.; this clutch unit 8 is preferably electro-magnetic.

The shaft 6 also drives a movable member 10, 11 of the speed-reducer unit Ra which acts in the manner of a brake. The auxiliary motor Ma is supplied from a battery of accumulators 12, the output circuit of which can be interrupted by means of a switch 13 placed under the control of the driver, and a contactor A which is subjected to the action of an electro-magnet is also inserted in this circuit.

A second winding 14 forming part of the speed-reducer unit is supplied by a voltage taken from the terminals of the motor MT. The circuit supplying the electro-magnet $a$ is interrupted by a contact lever 15 operated by an auxiliary cam mounted on the cam-shaft 9 of the change-over switch Co, this combined assembly 15—$a$ and A being arranged to open the output circuit of the accumulator 8 at the end of the starting period.

It will be observed in FIG. 1 that the electro-magnet 16 which controls the clutch unit 8 is shunted on the terminals of the auxiliary motor Ma and either engages or releases the cam-shaft 9 depending on whether the said motor Ma is under tension or under no-tension.

The motor Ma drives the shaft 6 with a practically constant torque which is consequently independent of its speed of rotation. This result is effectively obtained when the said motor is a direct current motor and preferably of the separate excitation type, the inductor of which is shown at 17, a suitable resistance 18 being inserted in the circuit supplying the armature of the said motor.

Since the speed of the said motor remains low with respect to its normal running speed, the counter electromotive force developed is small with respect to the voltage of the accumulators 12. The armature of this motor is thus supplied by a practically constant current since it is mainly limited by the resistance 18. Furthermore, the flux produced by the inductor 17 is also constant; consequently, this motor operates with a substantially constant torque. The speed of rotation of the said motor is therefore determined by the resistive torque which is set up in opposition thereto. The speed-reducer unit Ra is preferably constituted by a multipolar machine of the homopolar type and which therefore only has magnetic poles $X_1$—$X_2$—$X_3$—$X_4$ having the same polarity.

Figure 3:
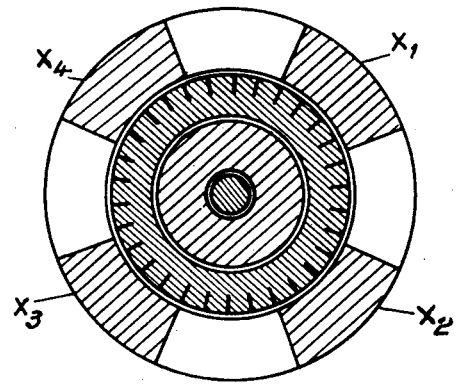
FIG. 3 is a cross-section taken along the line III—III of FIG. 2.
Figure 4:
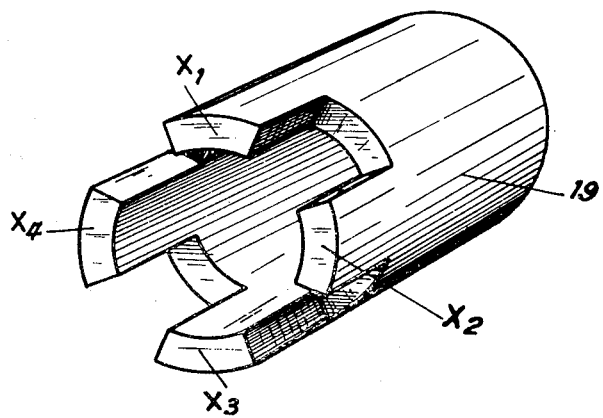
FIG. 4 is a view in perspective of the inductive external member of the speed-reducer unit.

The inductor is composed on a part 19 coupled to a magnetic core 20 which supports the excitation windings 14 and 5. A view in perspective of the part 19 is illustrated in FIG. 4. In addition, the poles are shown in FIG. 3 by shaded surfaces. The movable magnetic part 10 which is concentric with the part 19 can rotate opposite the said poles; the said part 19 is provided wtih bars 11 which are good conductors of electricity and which are uniformly spaced apart so as to constitute a "squirrel cage."

The operation of this device is as follows: under the combined effects of the currents which pass through the windings 5 and 14, a magnetic flux is produced in the core 20 and is enclosed while following the path of the lines of force which make use of the magnetic poles $X_1$, $X_2$, etc. If one considers a single turn or winding of the squirrel cage, the rotation of the rotor causes this turn to be subjected to variations of the flux which passes through the said turn, depending on whether this turn is located in front of one of the poles $X_1$, $X_2$, etc., or between two of these poles. These variations of flux create electro-motive forces and consequently produce induced currents in the squirrel cage; these induced currents act in oposition to the source by which they are produced, namely the rotation of the rotor. The said rotor is therefore braked by the currents in question and this braking effect results in a resistive torque which is employed to oppose the constant torque of the motor M$a$. This resistive torque is an increasing function of the speed of rotation of the rotor of the speed-reducer unit and also an increasing function of the magneto-motive forces.

These relations are represented in the form of a graph in FIG. 5. In this figure, the speeds are plotted as abscissae, the torques are shown as ordinates and the magneto-motive forces are taken as parameters.

The coupling of the speed-reducer unit R$a$ with the motor M$a$ constitutes the servo-motor in the manner previously explained. The motor, having a practically constant driving torque C$m$, drives the speed-reducer unit and is braked by this latter, the resistive torque C$r$ of which is a function of the speed of rotation. It is known that the normal running speed is reached when the driving and resistive torques are equal.

FIG. 5 thus shows that the servo-motor reaches the speeds $N_1$, $N_2$, $N_3$ . . . when the speed-reducer unit is subjected to the magneto-motive forces $AT_1$, $AT_2$, $AT_3$ . . . In order to make the description clear, it has been assumed that the speed-reducer unit and the motor were coupled directly by means of the shaft 5, for example. It is undertsood, however, that this is only one particular case, whereas the same reasoning remains valid irrespective of the coupling means employed; it is merely sufficient to relate speeds and torques to the same shaft.

The servo-motor, which is one of the objects of the invention, constitutes an effective means for controlling the speed of rotation of the cam-shaft 9 in dependence on the state of magnetization of the core of the speed-reducer unit R$a$. In accordance with the invention, this state of magnetization is in turn a function of the conditions of operation of the vehicle, by virtue of the combined action of the windings 5 and 14 which predetermine the magneto-motive forces $AT_1$, $AT_2$, $AT_3$ . . . which has been explained above. This will be understood with reference to FIG. 6 which is a diagram of the speeds V reached by the vehicle as a function of the currents I supplying the traction motor in relation to the various resistances R'0, R'1, R'2 . . . which are inserted in the supply circuit. At the initial starting stage, the change-over switch establishes the contact at 0'; at this moment, the resistance inserted in the supply circuit is R', as can be seen in FIG. 1. At the first moment of starting, the current is I$o$ and the speed is 0. The vehicle is brought up to speed and the current surge decreases; in FIG. 6, the figurative point of the condition of operation describes the substantially straight curve R'0. It will be assumed, for example, that the speed of rotation imparted to the cam-shaft is such that the contact is established at 1' when the figurative point is located at $V_1$ on the curve R'0. The supply current is in that case $I_1$ and the speed of the vehicle is $V_1$.

At this moment, the resistance insterted is R'1, and the speed being $V_1$, the figurative point will move along the curve having the reference R'1 starting from the point $V_1$. Furthermore, the resistance R'1 is so determined that a supply current I$o$ corresponds to the speed $V_1$ on the curve R'1. The servo-motor is regulated so that the speed of rotation of the cam-shaft is such that the contact is established at 2' when the figurative point on the curve R'1 is located at $V_2$ having the abscissa $I_1$ and so forth, the points $V_1$, $V_2$, $V_3$ . . . having as abscissae $I_1$ and $Io$. The advantage of this method of starting is that it is effected under a mean current I$m$ which is always as close as may be desired to the maximum current permissible for the proper preservation of the material and the comfort of passengers, that is to say with the maximum rapidity which is compatible with the foregoing data.

Furthermore, a more thorough study of the diagram of FIG. 6 elicits the fact that the intervals of time $t_1$, $t_2$, $t_3$ . . . which elapse between the establishing of the successive contacts 0' 1' 2' 3' . . . are not equal and that these intervals of time progressively decrease from the beginning to the end of the starting period. This means that the cam-shaft must rotate at a much higher speed at the end of the starting period than at the beginning. In accordance with FIG. 5, this condition is met by subjecting the magnetic circuit of the speed reducer unit R$a$ to a magneto-motive force $AT_1$ which is much greater at the beginning of the starting period than at the end thereof, at which the said magneto-motive force would then be $AT_4$.

In accordance with one of the characteristic features of the invention, this condition is obtained by making use of the two excitation windings 5 and 14 having opposing action as shown by the arrows. In fact, at the beginning of the starting operation, and inasmuch as the traction motor only rotates at a low speed, the voltage on the brushes is low and the de-magnetizing action of the winding 14 has very little appreciable influence; the magneto-motive force resulting from 14 and 5 is thus at a maximum. Progressively as the speed of the traction motor increases, the voltage at the motor terminals increases and the de-magnetizing action of the winding 14 becomes more powerful, and consequently the resulting magneto-motive force decreases; and in accordance with the graph shown in FIG. 5, the servo-motor thus imparts an ever-increasing speed to the cam-shaft.

It is understood that, as a result of and by means of the regulation of the resistance 21 and the suitable choice of the number of turns of the two excitation windings and of the characteristics of the magnetic circuit of the speed-reducer unit, it is endeavoured to obtain intervals of time between the successive establishing of the contacts at 1', 2', 3' which are as close as possible to the times $t_1$, $t_2$, $t_3$ . . . which were considered previously.

The operation of the device as a whole such as described above is as follows:

In the initial position, the electro-magnet $a$ is not excited, A is in the position of contact. The operator or driver closes the output circuit of the accumulator 12 by means of the switch 13. The voltage of this accumulator is applied to the motor M$a$ and to the winding 16 of the clutch unit 8. The motor M$a$ is set in rotation and at the same time, the clutch unit 8 rigidly couples the cam-shaft 9 to the servo-motor M$a$, R$a$. As soon as the contact is established, the traction current builds up to its maximum value I$o$ which is limited at the outset only by the resistance R'O. The action of the excitation winding 5 is at its maximum and the braking action of the speed-reducer unit is substantial, the rate at which the contacts at 1', 2', 3' are established being therefore slow. When the motor MT increases speed, the mean de-magnetizing action of the winding 14 becomes greater and, by acting in opposition to that of the winding 5 which in turn remains at a substantially constant mean value, the magneto-motive force actuating the speed-reducer unit decreases. The braking action of the said speed-reducer unit decreases as the acceleration of the motor increases. The servo-motor thus imparts a greater and greater speed to the cam-shaft and consequently the rate of elimination of the starting resistances becomes progressively faster. This complies with the conditions explained above for obtaining a practically constant starting action at medium current intensity. At the end of the starting period, when the last resistance has been eliminated, the contact is established at 0 and the electromagnet *a* is excited. A then opens the output circuit of the accumulator: the motor Ma is stopped and the camshaft 9 is uncoupled from the speed-reducer unit as a result of the operation of the clutch unit 8, the coil 16 exciting this latter being no longer supplied.

When the starting operation is completed, the driver allows the switch 13 to return to its initial position. From this moment, the automatic starting device no longer plays any part in the operation of the cam-operated change-over switch and, in particular, this latter can return to the position corresponding to that of the vehicle when stopped, under the influence of devices which are unrelated to the present invention.

It is of course understood that the method of execution or construction which has just been described is given only by way of non-limitative example and that alternative forms of execution can be devised without thereby departing from the scope or the spirit of the invention. In particular, instead of making use of a separate excitation motor to constitute the constant-torque motor, it is also possible to employ a suitably adapted series excitation motor. The speed-reducer unit which has been described has been chosen because it calls for the use of fixed excitation windings which are particularly simple to construct. Devices have been built, however, with heteropolar machines having projecting poles. Machines can also be designed in which the windings are not fixed but which in such a case rely upon slip rings and brushes for their supply.

In our example of construction, the rotor is provided with a cage comprising a certain number of conductive bars; the number of these bars can also be multiplied indefinitely until, when touching each other, they constitute a conductive tube which encircles the rotor. It should be noted, moreover, that FIG. 1 is only intended to provide an extremely simplified diagram of connections so that there are only shown therein those switches and elements which are absolutely essential to the operation of the device; accordingly, the winding 5 is not necessarily supplied with the full traction current; it is merely sufficient that it should be supplied with a proportional current.

In order to simplify the foregoing description, it has been assumed that the resistive torque resulting from this mechanism was negligible compared with that of the speed-reducer unit. This assumption is justified inasmuch as the most suitable value of torque developed by the said speed-reducer unit can be provided according to the manner of its construction.

What we claim is:

1. In a device of the type described, an auxiliary motor producing a substantially constant torque and a speed-reducing unit constituted by a multipolar machine of the homopolar type and comprising two excitation windings arranged in such manner that their magnetic effects are oppositely acting, one of said excitation windings being supplied with a current which is proportional to the current sent to the traction motor, the other excitation winding being supplied with current taken from the terminals of said traction motor, said speed-reducing unit producing in opposition to said auxiliary motor a resistive torque which is an increasing function of the speed of rotation of said speed-reducing unit.

2. In a device of the type described, an auxiliary motor of the direct current type having independent excitation, a speed-reducing unit constituted by a multipolar machine of the homopolar type, said speed-reducing unit comprising two excitation windings arranged in such manner that their effects are oppositely acting, one of said excitation windings being supplied with a current which is proportional to the current sent to the traction motor, the other excitation winding being supplied with current taken from the terminals of said traction motor, said speed-reducing unit producing in opposition to said auxiliary motor a resistive torque which is an increasing function of the speed of rotation of said speed-reducing unit.

References Cited in the file of this patent

UNITED STATES PATENTS

| | | |
|---|---|---|
| 839,687 | White | Dec. 25, 1906 |
| 1,126,163 | Cooper | Jan. 26, 1915 |
| 1,752,179 | James | Mar. 25, 1930 |
| 2,492,395 | Pavitt et al. | Dec. 27, 1949 |

FOREIGN PATENTS

| | | |
|---|---|---|
| 454,929 | England | Oct. 5, 1936 |